May 26, 1936.　　O. M. FINLEY　　2,041,998
AUTOMOBILE SCREEN
Filed Oct. 10, 1933

Oscar M. Finley,
INVENTOR
BY Victor J. Evans & Co.
ATTORNEY

Patented May 26, 1936

2,041,998

UNITED STATES PATENT OFFICE 2,041,998

AUTOMOBILE SCREEN

Oscar M. Finley, Waco, Tex.

Application October 10, 1933, Serial No. 693,027

4 Claims. (Cl. 156—14)

The invention relates to automobile screens and has for the primary object the provision of a device especially adapted for use in connection with ventilating windows of automobiles for the purpose of preventing insects, dirt and other foreign matter from entering with the air into the body of the automobile when said window is set for ventilating purposes.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a fragmentary side elevation illustrating a portion of an automobile body with an improved type of window ventilator with my invention applied thereto.

Figure 1:
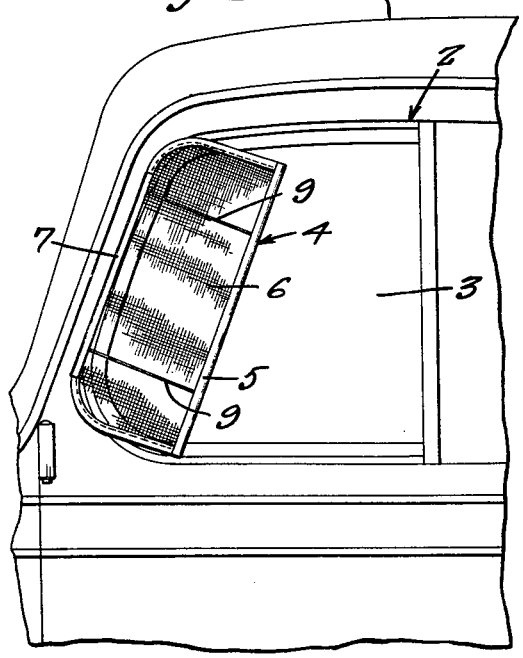
Figure 2:
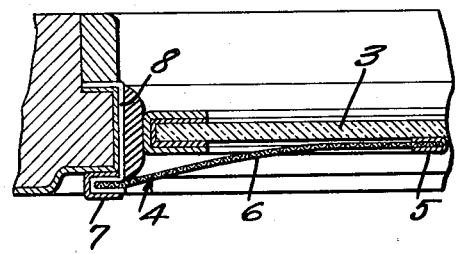
Figure 2 is a fragmentary horizontal view illustrating the same.
Figure 3:
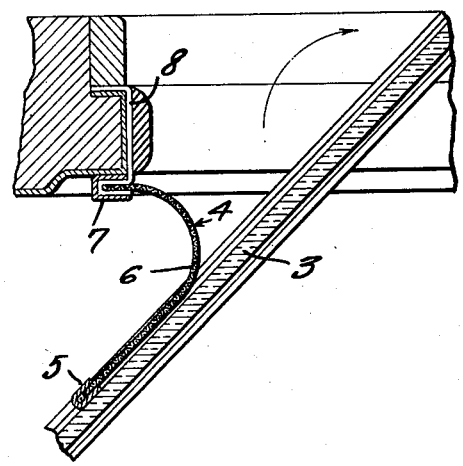
Figure 3 is a similar view showing the window ventilator positioned to admit air to the interior of the automobile body with my invention acting to prevent the entrance of dirt and other foreign matter.
Figure 4:
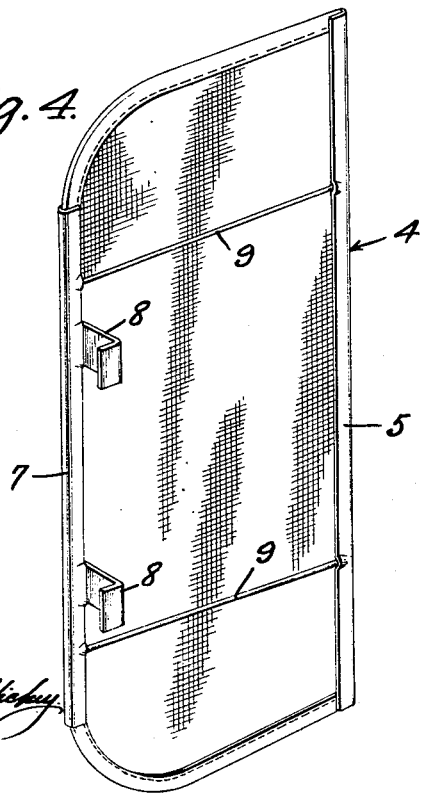
Figure 4 is a perspective view illustrating a screen.

Referring in detail to the drawing, the numeral 1 indicates a fragmentary portion of an automobile body having a window 2 of the ventilating type, that is, the panel section 3 is capable of swinging about a vertical axis for the purpose of directing air into the body of the automobile, as shown in Figure 3, or for closing the window opening or for positioning inwardly of the body of the automobile so as to draw air out from the interior of said automobile body. To prevent the entrance of dirt and other foreign matter to the interior of the automobile body when the panel 3 is adjusted, as shown in Figure 3, a screen 4 is employed which consists of a flexible frame 5 closed by foraminous material 6. One side of the frame carries a channeled member 7 on which are formed brackets 8 of substantially U-shape. The brackets 8 engage the window frame, as shown in Figure 3, fixing one end of the screen to the body of the automobile while the other end of the screen bears against the panel 3 of the ventilating window. Spring members 9 connect the ends of the screen for the purpose of urging the free end of the screen to bear at all times against the panel 3.

From the foregoing description, taken in connection with the accompanying drawing, it will be noted that a very inexpensive screen has been provided which may be easily and conveniently installed to an automobile body or the window frame thereof for the purpose of preventing the entrance of insects, dirt and other foreign matter when the ventilating or adjustable panel thereof has been positioned to admit air to the interior of the automobile.

While I have shown and described the preferred embodiment of my invention, it will be understood that minor changes in construction, combination and arrangement of parts may be made without departing from the spirit and scope of my invention, as claimed.

Having described the invention, I claim:

1. In a window frame and a window provided with a swinging ventilating panel, a flexible screen frame, a foraminous material closing said screen frame, brackets for securing one end of the screen frame to the window frame with the other end of said screen frame bearing against the ventilating panel, and spring members between the ends of the screen frame to cause the free end of said screen frame to yieldably bear against the ventilating panel.

2. In a ventilating window provided with a swinging panel, a flexible screen bearing frame having one end fixed and the other end adapted to slidably and yieldably engage the panel when the panel is positioned for ventilating or non-ventilating purposes.

3. In a window frame and ventilating window provided with a swinging panel, a flexible screen bearing frame having one end fixed and its other end adapted to bear against the panel, said panel serving to flex the frame and its screen when swinging movement is imparted to the panel.

4. In a window frame and window provided with a swinging panel, a flexible frame, a screen closing the frame, means on the flexible frame for securing one end to the window frame, the other end of said flexible frame being adapted to constantly engage the panel and to be flexed when swinging movement is imparted to the panel.

OSCAR M. FINLEY.